United States Patent [19]

Monford, Jr.

[11] 3,795,900

[45] Mar. 5, 1974

[54] MULTIFUNCTION AUDIO DIGITIZER

[75] Inventor: Leo G. Monford, Jr., Texas City, Tex.

[73] Assignee: The United States of America as represented by the Administrator of the National Aeronautics and Space Administration, Washington, D.C.

[22] Filed: Nov. 9, 1971

[21] Appl. No.: 196,931

[52] U.S. Cl.......... 340/347 AD, 325/38 B, 332/11 D

[51] Int. Cl............................................. H03k 13/22

[58] Field of Search.. 340/347; 325/38 B; 332/11 D; 328/114, 132

[56] References Cited

UNITED STATES PATENTS

| | | | |
|---|---|---|---|
| 3,467,876 | 9/1969 | Tatsuzawa et al. | 325/38 B X |
| 3,091,664 | 5/1963 | Tyrlick | 325/38 B X |
| 3,544,895 | 12/1970 | Richman | 340/347 AD |
| 3,339,142 | 8/1970 | Varsos | 332/11 D X |

FOREIGN PATENTS OR APPLICATIONS

| | | | |
|---|---|---|---|
| 1,028,954 | 5/1966 | Great Britain | 340/347 |

OTHER PUBLICATIONS

B. W. Stephenson "Analog Digital Conversion Handbook", 1964, pg. 58–59.

*Primary Examiner*—Charles D. Miller
*Attorney, Agent, or Firm*—Carl O. McClenny; Marvin F. Matthews; John R. Manning

[57] ABSTRACT

An illustrative embodiment of the present invention includes apparatus which simultaneously produces both direct delta modulation and pulse code modulation. An input signal, after amplification, is supplied to a window comparator which supplies a polarity control signal to gate the output of a clock to the appropriate input of a binary up-down counter depending on whether the slope of the input signal is positive or negative. The control signals provide direct delta modulation while the up-down counter output provides pulse code modulation.

1 Claim, 2 Drawing Figures

LEO G. MONFORD JR.
INVENTOR.

BY

M. J. Marnock
ATTORNEY

MULTIFUNCTION AUDIO DIGITIZER

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

1. Field of the Invention

This invention relates generally to encoders or modulators. More particularly, the present invention relates to encoders for simultaneous use as either or both a pulse code modulator (PCM) or a delta code modulator (DM).

2. Brief Description of the Prior Art

In modern communication systems, it is frequently necessary to interface data simultaneously with several types of transmission schemes. For example, in space travel applications, it may be desirable to communicate voice information internally within a space vehicle by wireline while a digital encoding scheme is necessary for transmitting the voice link data from the spacecraft to ground controllers. Similarly, in military applications, it may be necessary to transmit data via wireline telephone for local distribution as to a tactical command post while also simultaneously providing a wireless communication link with a strategic command post situated in a remote location.

From these examples, it will be appreciated that it has frequently been necessary in the prior art to provide plural modulation or encoding systems which can act on a signal waveform, either in parallel or series operation, to provide the required dual modulation modes.

The number of circuit elements required for developing plural modulation waveforms in the various prior art schemes has been undesirably high. The number of systems and system components is a direct factor in determining the efficiency with which information may be transmitted. In an effort to minimize the size and number of components used to generate modulation waveforms for transmission, equipment engineers have turned to multi-use integrated circuits which embody many faceted combinations of more common devices. To date, however, it has been impractical to produce a single circuit design which can provide dual modulation capability without encountering a substantial amount of redundancy, hence inefficiency, in the use of integrated circuit devices. In particular, it has heretofore been impractical to employ a single encoding system which simultaneously provides both delta modulation (DM) and pulse code modulation (PCM) while meeting all other standard audio interface parameters.

SUMMARY OF THE INVENTION

The present invention comprises a dual DM and PCM circuit in which an analog input signal is processed through an input amplifier which provides variable sidetone and a high input impedance for small signal input transducers. The output of the input amplifier is fed to a second amplifier used as an analog adder. A control feedback signal is also input to the adder with the adder's output being dependent upon the analog input signal and the feedback signal which in turn is dependent upon the DC bias and the digital output position of an internally generated analog control signal derived from a D to A converter. The adder output is fed to a window comparator having a window of slightly less width than one binary step in the PCM encoding scheme. The comparator output is employed to condition a pair of input gates to gate a clock or time reference of the system into a binary up-down counter. No frequency-dependent parameters or components are inherent in the circuit design so that clock frequency may be varied from DC to the upper frequency limits of TTL circuitry. The binary up-down counter outputs are strobed at an appropriate rate (in excess of the Nyquist frequency) to a modulation register or to other encoding matrix circuitry to provide pulse code modulation (PCM). The digital-to-analog converter and a bias control are employed to provide the current feedback into the analog adder.

Other features of the invention in addition to the above described dual DM and PCM capability are the provision therein for a sidetone or signal monitor, the inclusion of a maximum modulation monitor, and the provision of a combination manual and automatic gain control circuit.

Accordingly, it is an object of the invention to provide a single circuit design which produces both DM and PCM capability simultaneously.

It is a further object of the invention to provide a circuit for producing DM and PCM without undue redundancy of circuit elements.

It is still further an object of the invention to provide a flexible circuit arrangement which produces DM and PCM waveforms and in which the number of bits of coding accuracy and clock rate are easily expandable.

The invention, including these and still further objects, features and advantages may be better understood by reference to the following specification, drawing and the appended claims.

DESCRIPTION OF THE PREFERRED EMBODIMENT

Figure 1:
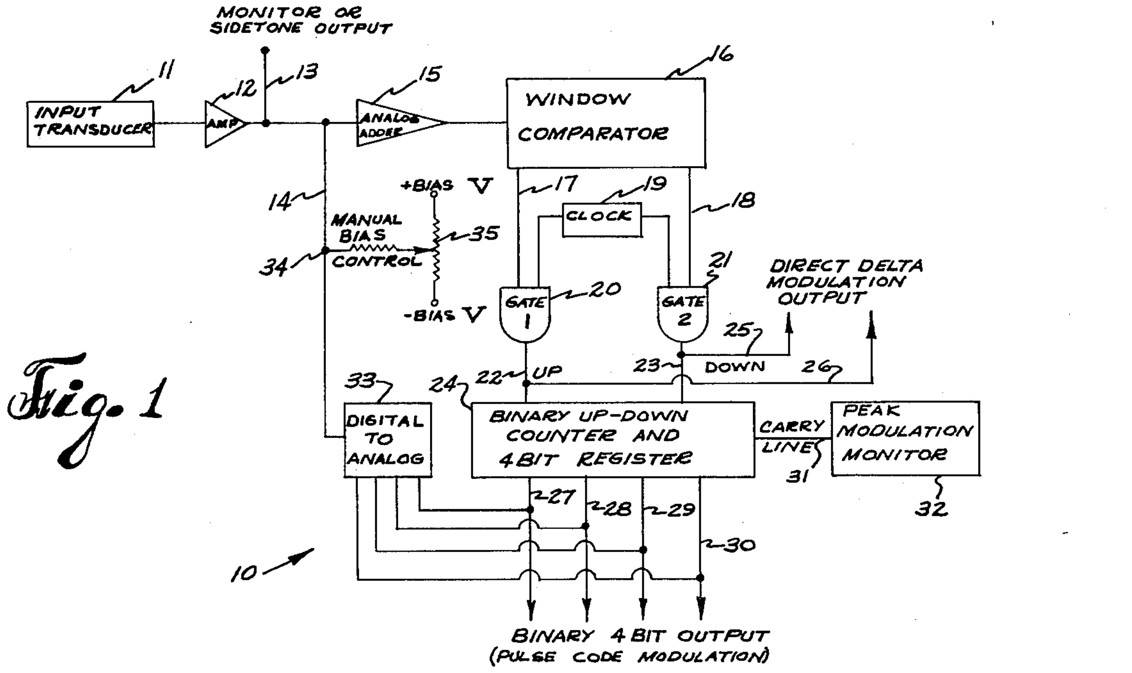
FIG. 1 is a schematic block diagram illustrating the overall circuit arrangement of the preferred form of the present invention.

Referring initially to FIG. 1, a preferred circuit for producing simultaneous PCM and DM waveforms is indicated generally at 10 in schematic block diagram form. The waveform or data input source to the circuit 10 is illustrated as an input transducer 11. It will be appreciated that the transducer 11 may comprise a microphone, a temperature sensor, a pressure sensor or any other analog input signal transducer or means which provides a time variant output in the form of an analog waveform or voltage. The signal from the input transducer 11 is amplified by a preamplifier 12 to increase its voltage level for further processing. The output signal from the preamplifier 12 is of sufficient power level to be monitored, as for example via line 13, to provide a sidetone or monitor output. For this purpose, the preamplifier 12 may be any of a number of standard linear analog voltage amplifier devices. The principle requirement for the preamplifier 12 is that it be essentially a linear device in order to avoid input waveform distortion and high gain.

The output of the preamplifier 12 is summed with an analog control voltage signal provided on line 14. The derivation of the analog control voltage signal will be discussed subsequently. Summing of the preamplifier output signal and the control signal is effected by a second analog amplifier which is used as an analog adder for this purpose. Use of the amplifier 15 as an analog adder provides a degree of comparison in order to optimize the PCM signal-to-noise ratio as known in the art.

The output from the analog adder 15 is supplied to a window comparator 16 (for example, Burr-Brown Model 4022/25) which has a window or comparison step slightly less than one binary quantitization step wide. Thus, the comparator 16 can sense a change in magnitude of its input signal of slightly less than one binary PCM unit and consequently change its output signal accordingly. For example, if a voltage range of 16 volts is possible in the input signal waveform and a four binary digit or bit PCM code is used to encode this range, the comparator 16 could sense a voltage level change of slightly less than 1 volt and change its output signal accordingly.

If the voltage level input to the window comparator 16 changes by increasing from its prior value, the comparator 16 produces an output voltage level on an output line 17. If the voltage level input to the comparator 16 changes by decreasing from its prior value, the comparator 16 produces an output voltage level on a second output line 18.

The output voltages from the window comparator 16 on lines 17 and 18 are used to condition either of two control gates 20 or 21 as appropriate. A clock 19 or other timing source is simultaneously supplied to the opposite inputs of the two control gates 20 and 21. Thus, if the analog input signal is increasing from its prior value, clock pulses are supplied to the count-up input of a binary up-down counter 24 via line 22 from control gate 20. If, on the other hand, the analog input signal is decreasing, then clock pulses from the clock 19 are supplied to the count-down input of the binary up-down counter 24 via line 23 from control gate 21.

It should be noted that in using the above arrangement that the clock frequency determines the slope of the digital output. For proper operation this should equal or exceed the maximum slope of the analog input signal. This arrangement has the inherent feature that as long as the stated criterion is met, the clock frequency may be changed at will provided it does not exceed the counting capabilities of the binary up-down counter 24. Counter 24, moreover, while being illustrated as a four bit counter and register, could be extended very easily to an eight bit register or even more, if desired.

Direct delta modulation (DM) may be obtained from lines 22 and 23. Delta modulation of this type comprise two level pulses usually of opposite polarity which indicate the algebraic sign of the slope of the modulating analog waveform. If desired, however, an additional stage or stages of amplification (not shown) may be appended to output lines 25 and 26 to produce tri-level or bi-level delta modulation.

The output (four bits) of the binary up-down counter 24 provides four bit pulse code modulation via output lines 27, 28, 29 and 30 as illustrated in FIG. 1. Moreover, the carry line 31 of the counter 24 may be used as a peak modulation monitor. An indicator 32 such as a light emitting diode or other suitable voltage activated device may be connected to the carry line 31 to visually indicate the occurrence of an overflow count condition which would indicate overmodulation.

A digital to analog (D to A) converter 33, which may comprise a simple resistive ladder in the four bit example illustrated, monitors the output of PCM on lines 27, 28, 29 and 30 and provides an analog voltage level proportional to these outputs at junction 34. This analog voltage is summed at junction 34 with a bias voltage level produced by a bias power supply (not shown) and a manual bias control circuit 35 comprising a simple voltage divider network. The resultant sum of the control voltage output from D to A converter 33 and the variable manual bias is then supplied via line 14, as previously described, where it is added to the input signal in the analog adder 15. This automatic control feature may thus be used to provide a degree of compression to the input signal, thereby increasing the overall signal-to-noise ratio of the system.

Figure 2:
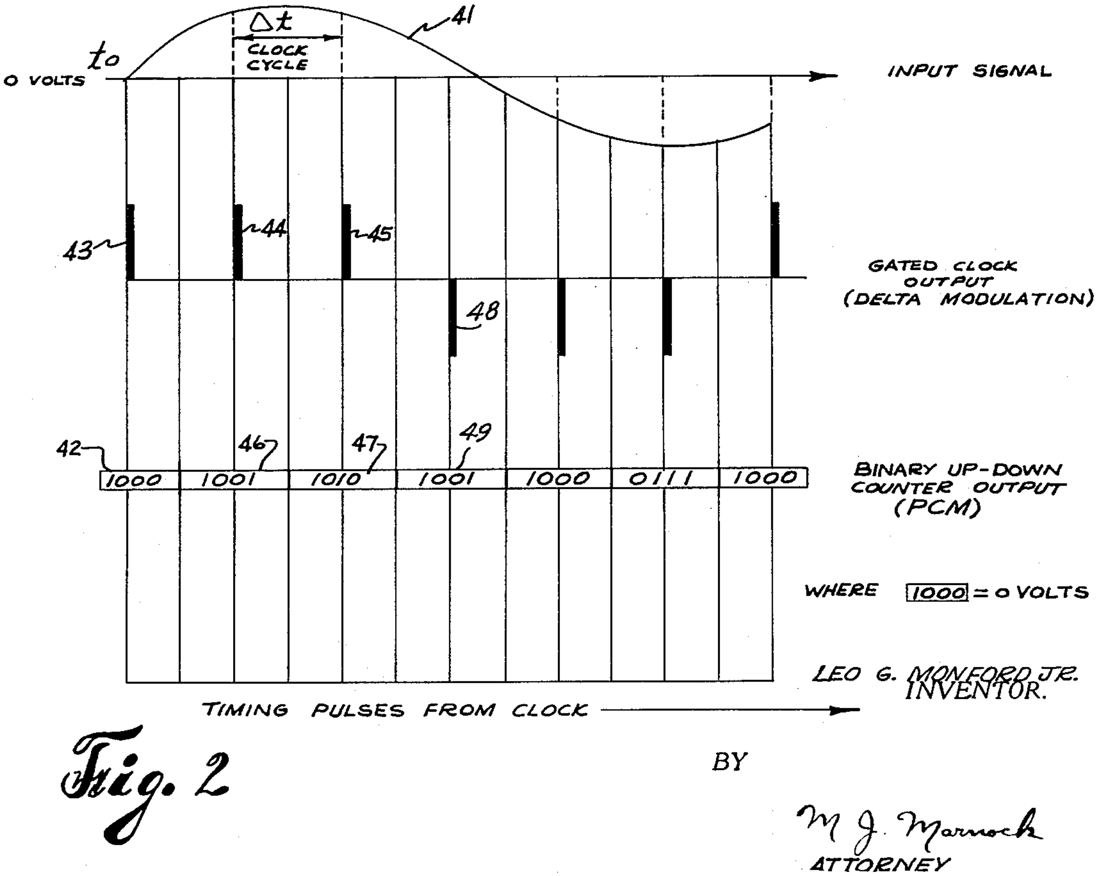
FIG. 2 is a timing diagram illustrating the voltage levels and binary outputs of the circuit of FIG. 1 as a function of time for an input waveform of arbitrary shape.

Referring now to FIG. 2, the operation of the system may be described as follows. Assume that initially at time $t_o$, the input signal (represented by curve 41) has the value 0 volts. This corresponds to a PCM binary value of [1,000] on a 16 level (four bit) code as illustrated by the initial PCM binary output word 42. The output of the window comparator 16 of FIG. 1 would be such as to gate the pulses of clock 19 via gate 20 and line 22 at this point (illustrated by pulse 43) to provide positive pulse delta modulation.

At $t_o + t$ and $t_o + 2t$, substantially the same situation would prevail with positive pulse delta modulation (pulses 44 and 45) and increasing PCM output (binary words 46 and 47). However, at $t_o + 3t$, the slope of the input waveform 41 will have changed and the DM output (pulse 48) will go negative (as supplied via gate 21 and line 23) while the PCM output starts to decrease (binary word 49).

The foregoing disclosure and description of the invention is illustrative and explanatory thereof, and various changes in the circuitry as well as in the details of the illustrated construction may be made within the scope of the appended claims without departing from the spirit of the invention.

I claim:

1. Apparatus for encoding data waveforms for modulating data transmission apparatus comprising:

a. transducer means for deriving an analog voltage signal representative of the input signal;

b. controlled analog amplifier means for amplifying said representative analog voltage signal;

c. analog adder means for algebraically adding said representative analog voltage signal to a second analog voltage signal which is derived by feedback means, thereby forming a composite signal potentiometer for manually controlling the input bias of said adder means;

d. window comparator means, having a comparison window whose width is preset to the analog equivalent of one binary step, for detecting the magnitude of said composite signal and for generating a "count-up" signal at a first output terminal of said comparator means when said composite signal exceeds a preset negative threshold, and a "count-down" signal at a second output terminal of said comparator means when said composite signal exceeds a preset positive threshold, thereby tending to maintain said composite signal at zero;

e. timing pulse generator means for generating timing pulses for timing the system;

f. a pair of control gates for receiving, as first inputs, the respective "count-up" or "count-down" signals from said comparator means; for receiving, as second inputs, said timing pulses; and for producing delta modulation output signals only when said first input is present and is in coincidence with said timing pulse; output means for extracting said delta modulation signals;

g. digital up-down counter means for receiving and counting said delta modulation output signals in either a count-up or count-down direction, thereby producing pulse-code-modulation signals at the output of said counter means which equal the analog input signal when both of said control gates have no output output means for extracting said pulse code modulation signals; a peak modulation monitor for monitoring the carry line of the said counter means;

h. means responsive to said control gates for supplying said delta output modulation signals to only one at a time of said counter means inputs, thereby producing a delta modulation signal with a count-up, count-down, or no-count format; and i. digital-to-analog converter means for monitoring the output of said counter means and for generating an analog feedback signal for application as said second analog voltage signal to said analog adder means.

* * * * *